US012608417B1

(12) United States Patent
Dhua et al.

(10) Patent No.: US 12,608,417 B1
(45) Date of Patent: Apr. 21, 2026

(54) ARTIFICIAL INTELLIGENCE LANGUAGE MODEL ORCHESTRATOR FOR INTERACTIVE SEARCHING

(71) Applicant: Amazon Technologies, Inc., Seattle, WA (US)

(72) Inventors: Arnab Dhua, Cupertino, CA (US); Oriol Barbany Mayor, Sabadell (ES); Sheng-Wei Huang, San Francisco, CA (US); Xinliang Zhu, Santa Clara, CA (US); Anuj Bindal, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/751,089

(22) Filed: Jun. 21, 2024

(51) Int. Cl.
*G06F 16/53* (2019.01)
*G06F 16/532* (2019.01)
*G06F 16/535* (2019.01)

(52) U.S. Cl.
CPC .......... *G06F 16/532* (2019.01); *G06F 16/535* (2019.01)

(58) Field of Classification Search
None
See application file for complete search history.

(56) References Cited

U.S. PATENT DOCUMENTS

| | | | | |
|---|---|---|---|---|
| 2019/0121879 A1* | 4/2019 | Canelis | ............... | G06F 3/04845 |
| 2019/0370547 A1* | 12/2019 | Lee | ................... | G06F 3/04817 |
| 2020/0334305 A1* | 10/2020 | Kussmaul | ........... | G06F 16/9535 |
| 2024/0020336 A1* | 1/2024 | Li | ........................ | G06F 16/7844 |
| 2024/0095275 A1* | 3/2024 | Tambi | ................... | G06F 16/538 |
| 2024/0256615 A1* | 8/2024 | Liu | ..................... | G06F 16/9532 |
| 2024/0256757 A1* | 8/2024 | Manavoglu | ........... | G06F 16/954 |
| 2024/0354332 A1* | 10/2024 | Zeng | .................... | G06V 10/751 |
| 2025/0181631 A1* | 6/2025 | Chaudhary | ........... | G06F 16/243 |

FOREIGN PATENT DOCUMENTS

WO WO-2024145537 A1 * 7/2024 ............. G06F 40/56

* cited by examiner

*Primary Examiner* — Augustine K. Obisesan
(74) *Attorney, Agent, or Firm* — Knobbe, Martens, Olson & Bear, LLP

(57) ABSTRACT

An artificial intelligence ("AI") search system includes a generative model orchestrator. A user provides an initial input query. The AI search system can determine initial search results. The AI search system receives subsequent input queries, which can include user input indicative of user intent in natural language, such as, altering, complementary, reinforcing, and unrelated intent. The AI search system creates input data that includes a prefix, format instructions, example(s), the input query, and/or contextual metadata. The AI search system provides the input data to the generative model orchestrator, which can, as instructed, output an action for a service, such as a search or image service. The AI search system executes the action, determines additional search results, and provide the additional search result(s).

20 Claims, 10 Drawing Sheets

ARTIFICIAL INTELLIGENCE LANGUAGE MODEL ORCHESTRATOR FOR INTERACTIVE SEARCHING

BACKGROUND

During text retrieval, a search engine can examine the contents of a database. In an electronic catalog context, a search engine can search titles, metadata, item descriptions, etc. Many typical search engines of electronic catalogs are exclusively text-based. A user submits a query, the search engine finds search results based on the query, and the search results are presented to the user. In some cases, the user can then narrow down the search results with filters.

An artificial intelligence ("AI") model, such as a large language model ("LLM"), can generate responses to requests or prompts. LLMs can achieve general-purpose language understanding and generation. An LLM can be an artificial neural network that follows a transformer architecture. LLMs can achieve these capabilities via machine learning statistical relationships from text documents during a computationally intensive self-supervised and/or semi-supervised training process. LLMs can be used for text generation by taking an input text and repeatedly predicting the next token or word.

Traditional graphics editors are computer programs that enable users to create, compose, and edit images with user interface controls. These user interfaces require specific user inputs via selecting from dropdowns and/or widgets to perform image editing.

DETAILED DESCRIPTION

As described above, some existing search systems allow text-based searching of a database. However, existing text-based search systems lack interactive searching with multimodal capabilities, such as natural language and image capabilities. Visual search systems can allow searching based on an input image to identify similar images. Natural language image editing with artificial intelligence can enable the editing of images with natural language. For example, if there is a picture of a horse in the mountains, an image editing system can receive the instruction "replace mountains with plains" and generate a new image of the horse with a different background. An improved search system can leverage artificial intelligence, natural language support, image capabilities, and service orchestration for improved interactive searching.

Generally described, aspects of the present disclosure are directed to systems and methods for improved interactive searching. An AI search system can receive multiple input queries from a user computing device. A user can provide an initial input query (such as an image and/or text) to the AI search system. The AI search system can determine initial search results of items based at least in part on the initial input query. The AI search system can provide the initial search results to the user computing device. The AI search system can receive subsequent input queries, which can include user input indicative of user intent, such as, altering, complementary, reinforcing, and unrelated intent, as described herein. For example, a user can request modification of certain attributes of an initial item (such as, changing a color, material, or a feature); a user can request to find an item that complements an initial item; a user can request to provide additional information and/or to improve the initial search results; and/or user input can be unrelated to an initial search result, such as indicating a new search objective of the user. The AI search system can create input data that includes a prefix, format instructions, example(s), the input query, and/or contextual metadata (such as titles of items from the initial search results). The AI search system can provide input data to a language model, such as an LLM, which can, as instructed, output an action for a service, such as a search or image service. The AI search system can execute the action, determine search results based at least in part on output of the action, and provide the additional search result(s) to the user computing device. In some embodiments, the AI search system can, via a language model, generate and output a natural language response to the input query.

Figure 1:
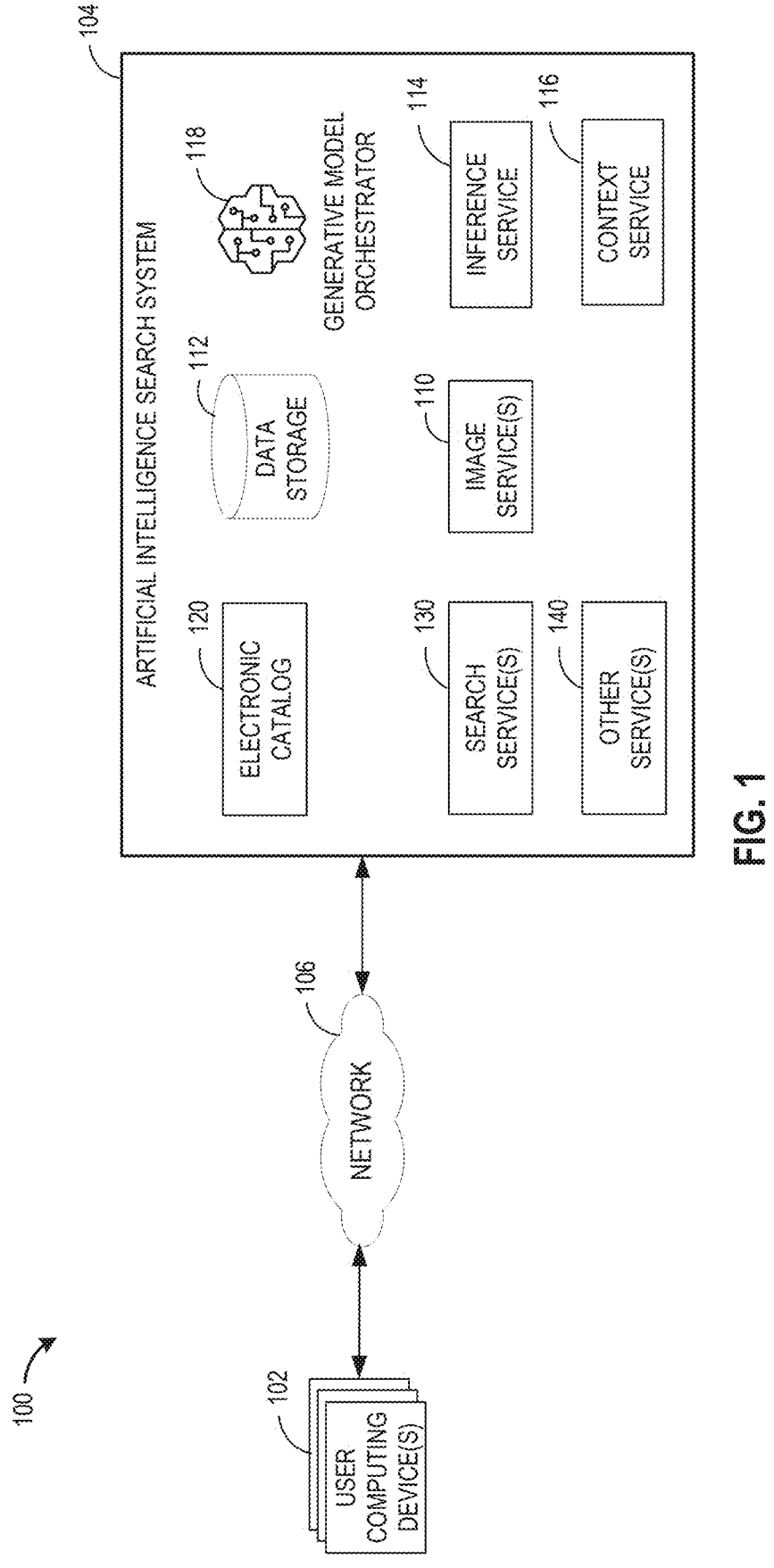
FIG. 1 is a schematic block diagram depicting an illustrative network environment including an AI search system that can perform interactive searching.

Turning to FIG. 1, an illustrative network environment 100 including an AI search system 104 that can provide an interactive search experience is depicted. As described herein, existing search user interfaces allow text search. The components of the network environment 100 can enable interactive searching with multimodal capabilities as an improvement over existing search user interfaces. The network environment 100 may include one or more user computing devices 102 and an AI search system 104. The AI search system 104 may include a language model orchestrator 118, image service(s) 110, search service(s) 130, other service(s) 140, an inference service 114, a context service 116, and an electronic catalog 120.

The electronic catalog 120 can store items. The electronic catalog 120 may include or be in communication with a data store of information about items that may be listed for sale, lease, etc. by an electronic marketplace, sellers, merchants and/or other users. The item information in this data store may be viewable by end users through a browsable or searchable user interface in which each item may be described in association with a network page, such as an item detail page, describing the item. Each item detail page may include, for example, item image(s) and description, customer ratings, customer and professional reviews, sales rank data, lists of related items, and/or other types of supplemental data that may assist consumers in making informed acquisition decisions. The electronic catalog 120 can provide a network page that enables users to interact with items, such as selecting, acquiring, and/or consuming items (such as watching or playing a media content item), where available. Users of the system may, in some embodiments, locate specific item detail pages within the electronic catalog by executing search queries, navigating a browse tree, and/or using various other navigation techniques. An item can refer to a data object that can represent a specific thing that has one or more definable attributes. For example, an item can represent things such as, but not limited to, a physical product.

Before receiving input queries, the AI search system 104 can train a generative model orchestrator 118. In some embodiments, the AI search system 104 can receive the generative model orchestrator 118 as a pre-trained model. In some embodiments, the AI search system 104 can retrieve the generative model orchestrator 118 from a third party. The generative model orchestrator 118 can be a generative model, such as, but not limited to, a foundational LLM. The foundational LLM can come in different sizes. Each foundational LLM can be trained on billions or trillions of tokens and can have billions of parameters. The LLM can be trained from text from languages with the most speakers (such as text from 10 or 20 languages with the most speakers) and can focus on languages with particular types of alphabets (such as Latin and Cyrillic alphabets). Since the generative model can be trained with documents in multiple languages, the generative model can be multi-lingual. The LLM can take a sequence of words as an input and predict a next word to recursively generate text. In some embodiments, the generative model orchestrator 118 can be a multimodal LLM. For example, in some embodiments, the generative model orchestrator 118 can include visual question answering capabilities, such as receiving an image and an input question and outputting a response to the question based at least in part on the image. In some embodiments, the generative model orchestrator 118 or another generative model can receive audio input (such as voice input) and perform natural language processing. In some embodiments, a training service can retrain (which can include fine-tuning) a pre-trained model with training data. Fine-tuning can refer to an approach to transfer learning where the weights of the pretrained model are trained on new data. During fine-tuning, the learning rate for training can be lowered. Fine-tuning can be performed on the entire neural network or on only a subset of its layers, in which case the layers that are not being fine-tuned remain the same. As described herein, the AI search system 104 can retrieve the pre-trained model from a third party. The training data can include sample input (such as sample user input queries) and expected output (such as the predicted actions and/or chain of thought reasoning, as described herein). Training by the training service can result in the generative model orchestrator 118. The training data can be stored in the data storage 112.

The AI search system 104 can communicate with the user computing devices 102. In some embodiments, the AI search system 104 can provide a user interface to the user computing devices 102. Via the user interface, a user can provide one or more input queries (which can include natural language and/or images) and can receive automated responses to their queries. Queries can include, are but not limited to, item seeking questions (such as "I like this motherboard, are there similar ones" and upload a picture of a motherboard or "I need a charger for this device" and upload a picture of a camera). User computing devices 102 can include, but are not limited to, a laptop or tablet computer, personal computer, personal digital assistant ("PDA"), hybrid PDA/mobile phone, smart wearable device (such as a smart watch), mobile phone, a smartphone, a smart speaker, and/or a virtual reality device. In some embodiments, the user computing device 102 can be installed with an application that communicates with the AI search system 104. In some embodiments, the user interface can be an audio interface and/or the user interface can receive audio/voice input.

At inference time (which occurs after the generative model orchestrator 118 has been trained), the AI search system 104 can receive an input query from a user computing device 102. In one use case, the initial input query can include an image (such as a picture of a computer case). As used herein, an "image" can refer to a two-dimensional representation, a three-dimensional representation, and/or an image within video data. The inference service 114 can invoke a search service 130 (such as an image matching service) and the search service 130 can identify item(s) (such as a similar computer case item) from the electronic catalog 120 matching the initial input image. The inference service 114 can provide the search results to the user computing device 102. The inference service 114 can then receive follow-up queries from the user computing device 102 in an interactive manner. For example, a follow-up query can include a request to alter an attribute of a search result (such as a different color computer case). Additional types of follow-up requests are described herein. The inference service 114 can create input data (such as a prompt) with instructions meant for the generative model orchestrator 118 (such as task specifications, formatting instructions, and/or example cases), context (such as metadata like titles for the previously-identified items), and/or the follow-up query. In some embodiments, the inference service 114 can invoke an image service 110, such as a visual question answering model, to receive a description of an image and the description can be used in the context for the generative model orchestrator 118. In some embodiments, the instructions can instruct the generative model orchestrator 118 to output a step-by-step process description, as described herein. The generative model orchestrator 118 can output one or more actions. An action can indicate a service 110, 130, 140 (such as a particular search service, image service, or other modality service) and a function to invoke for the service (such as invoking a search function that can alter an input image, such as replacing a color or removing or replacing an item attribute). The inference service 114 can invoke the identified service(s) and action(s). The inference service 114 can then provide result(s) based at least in part on output from the service(s) 110, 130, 140 to the user computing device 102. The AI search system 104 can receive further input queries and respond accordingly.

In some embodiments, the context service 116 can provide contextual metadata to the inference service 114. The context service 116 can maintain context (such as metadata like previously-identified items in search results, previous user navigations, and/or previous communication history from the user). The context service 116 can store context data in the data storage 112. In some embodiments, the context data can have a time to live and operate as a cache for user profiles.

In some embodiments, the generative model orchestrator 118 can output positive/negative keywords. The positive/negative keywords can be used by a ranking system (such as a ranking model) that either increases or decreases the ranking of search results based at least in part on the positive/negative keywords. For example, search results associated with positive keywords can be ranked relatively higher and search results associated with negative keywords can be ranked relatively lower.

The data storage 112 may be embodied in hard disk drives, solid state memories, or any other type of non-transitory computer readable storage medium. The data storage 112 may also be distributed or partitioned across multiple local and/or remote storage devices. The data storage 112 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications ("GSM") network, a Code Division Multiple Access ("CDMA") network, a Long-Term Evolution ("LTE") network, or any other type of wireless network. The network 106 can use protocols and components for communicating via the Internet or any of the other aforementioned types of networks, such as HTTP, TCP/IP, and/or UDP/IP.

The user computing devices 102 and/or the AI search system 104 may each be embodied in a plurality of devices. Each of the user computing device 102 and/or the AI search system 104 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program (a.k.a., computer-executable) instructions that the hardware processor executes in order to operate the user computing device 102 and/or the AI search system 104. The memory generally includes RAM, ROM, and/or other persistent and/or auxiliary non-transitory computer readable storage media.

Additionally, in some embodiments, the AI search system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer executable instructions. A hosted computing environment may also be referred to as a "serverless," "cloud," or "distributed" computing environment.

Figure 2:
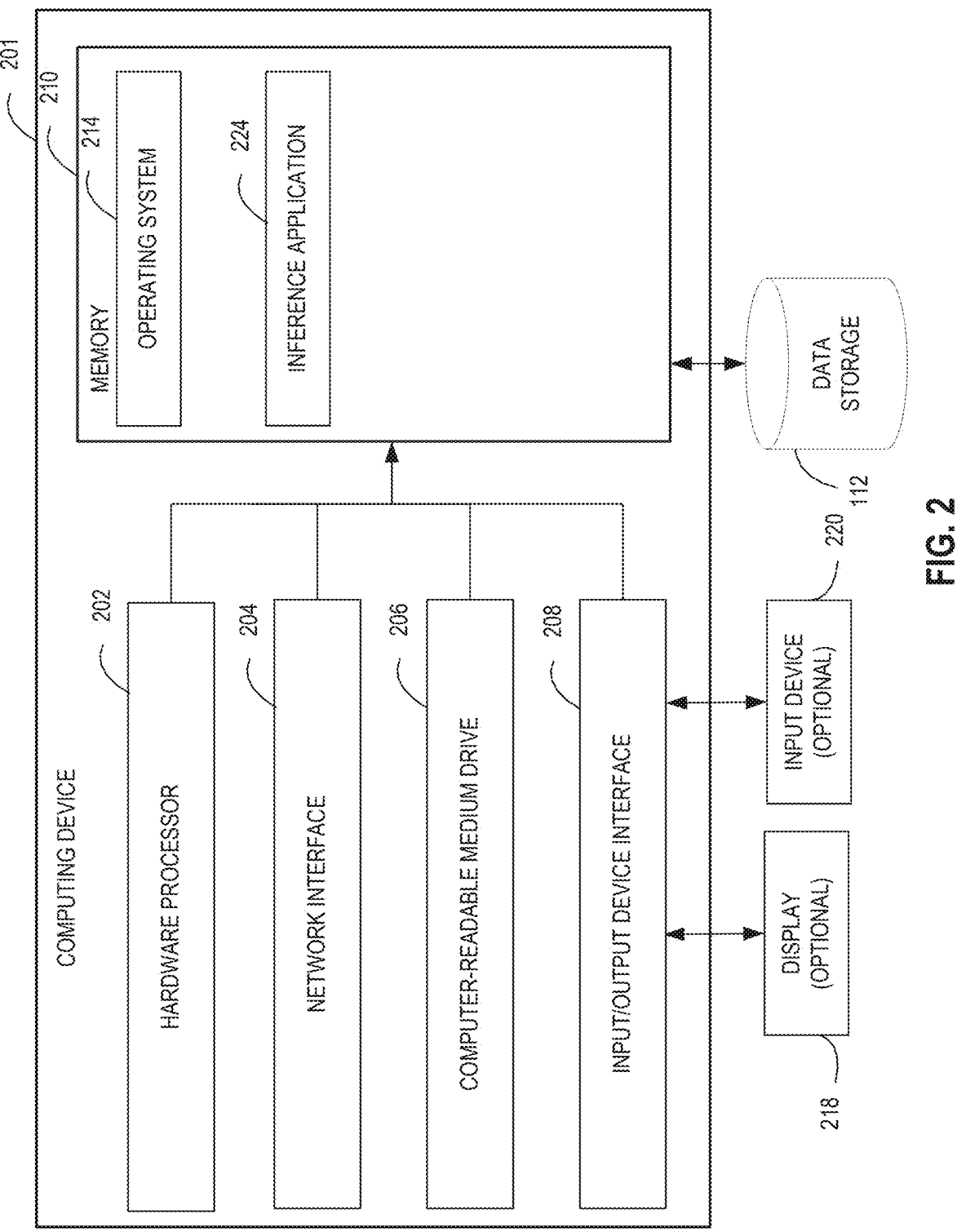
FIG. 2 is a schematic block diagram depicting an illustrative general architecture of a computing device for implementing the AI search system referenced in the network environment depicted in FIG. 1.

FIG. 2 is a schematic diagram of an illustrative general architecture of a computing device 201 for implementing the AI search system 104 referenced in the environment 100 in FIG. 1. In particular, a computing device 201 can be used to implement the inference service 114, the context service 116, the image service(s) 110, the search service(s) 130, and/or other service(s) 140. The computing device 201 includes an arrangement of computer hardware and software components that may be used to execute the inference application 224. The general architecture of FIG. 2 can be used to implement other devices described herein, such as the user computing device 102 referenced in FIG. 1. The computing device 201 may include more (or fewer) components than those shown in FIG. 2. Further, other computing systems described herein may include similar implementation arrangements of computer hardware and/or software components.

The computing device 201 for implementing an AI search system 104 may include a hardware processor 202, a network interface 204, a non-transitory computer-readable medium drive 206, and an input/output device interface 208, all of which may communicate with one another by way of a communication bus. As illustrated, the computing device 201 is associated with, or in communication with, an optional display 218 and an optional input device 220. The network interface 204 may provide the computing device 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, and/or touch screen. The input/output device interface 208 may also output audio data to speakers or headphones (not shown).

The memory 210 may contain specifically configured computer program instructions that the hardware processor 202 executes in order to implement one or more embodiments of a device within the AI search system 104. The non-transitory computer-readable medium drive 206 can store the computer program instructions. The memory 210 generally includes RAM, ROM and/or other persistent or non-transitory computer-readable storage media. The memory 210 may store an operating system 214 that provides computer program instructions for use by the hardware processor 202 in the general administration and operation of the device within the AI search system 104.

The memory 210 may include an inference application 224 that may be executed by the hardware processor 202. In some embodiments, the inference application 224 may implement various aspects of the present disclosure. The memory 210 may include a training application (not illustrated) that may be executed by the hardware processor 202. In some embodiments, the training application can receive training data; the training application can train, fine-tune, and/or retrain the generative model orchestrator 118 to predict services/actions to respond to input queries; the inference application 224 can predict services and actions with the generative model orchestrator 118; the inference application 224 can execute the services and actions; and/or the inference application 224 can provide results based at least in part on the service output to user computing devices 102.

Figure 3A:
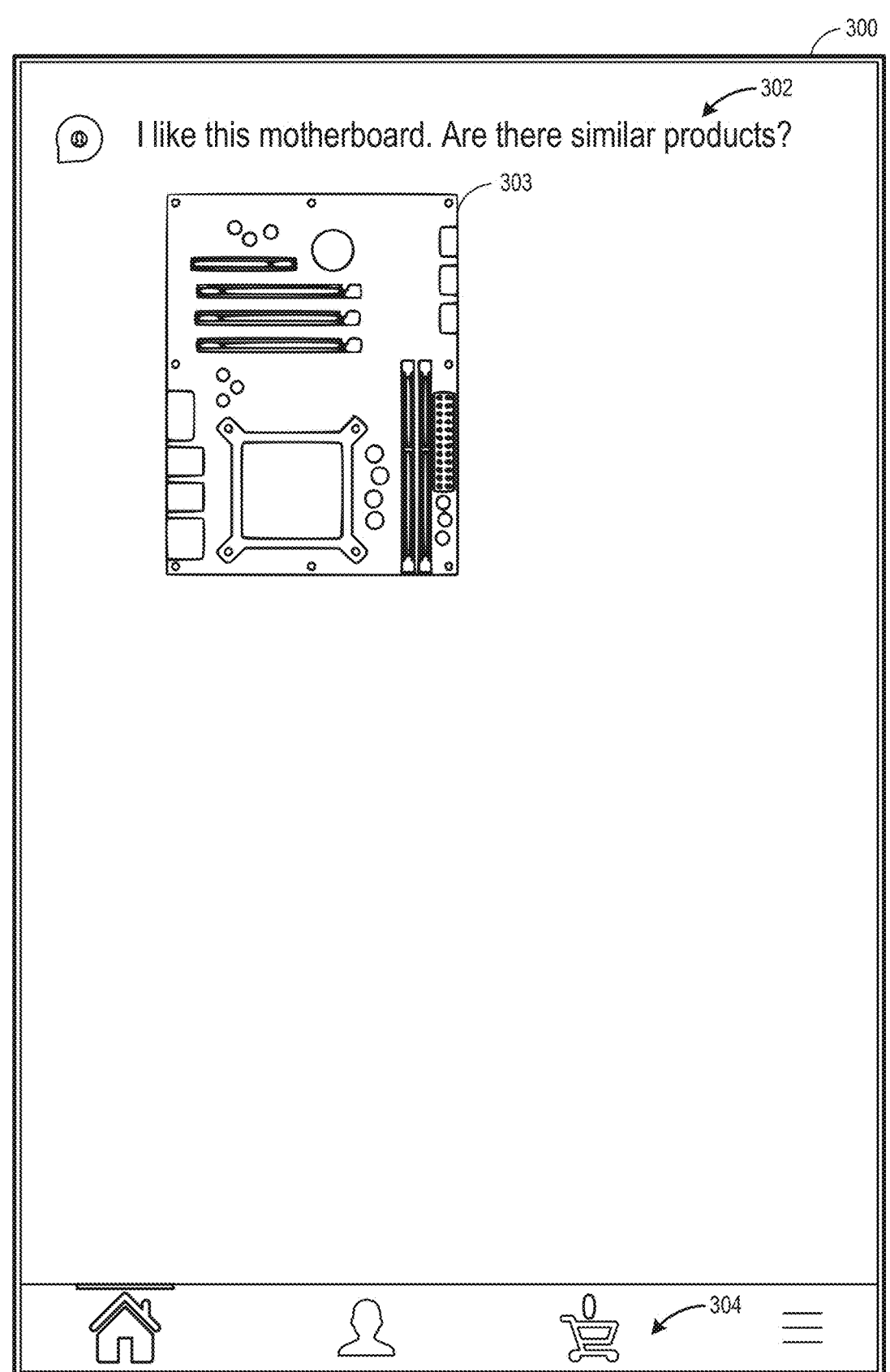
FIGS. 3A-3C depict example user interfaces presented on a user computing device referenced in the network environment depicted in FIG. 1.
Figure 3B:
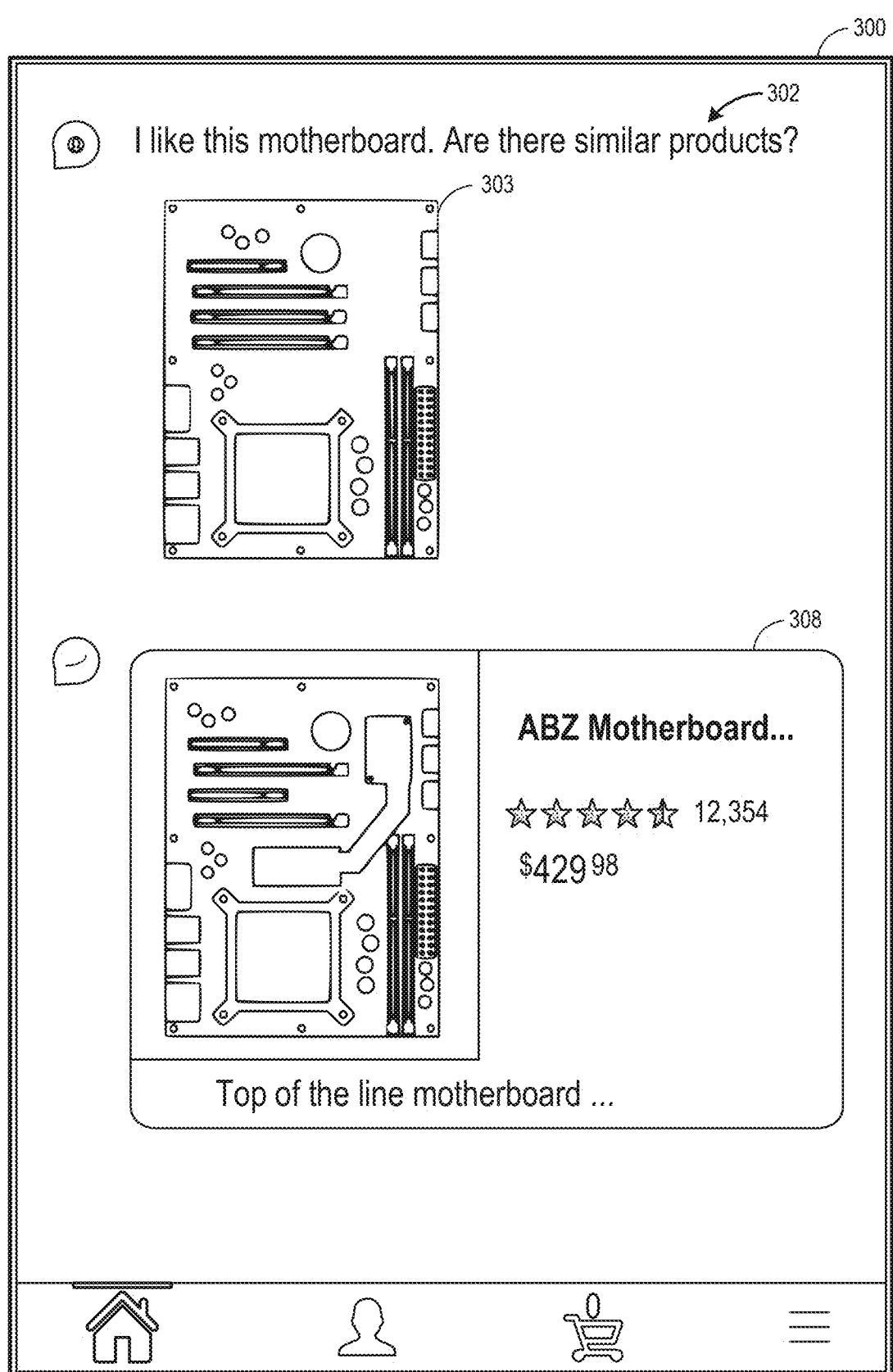
Figure 3C:
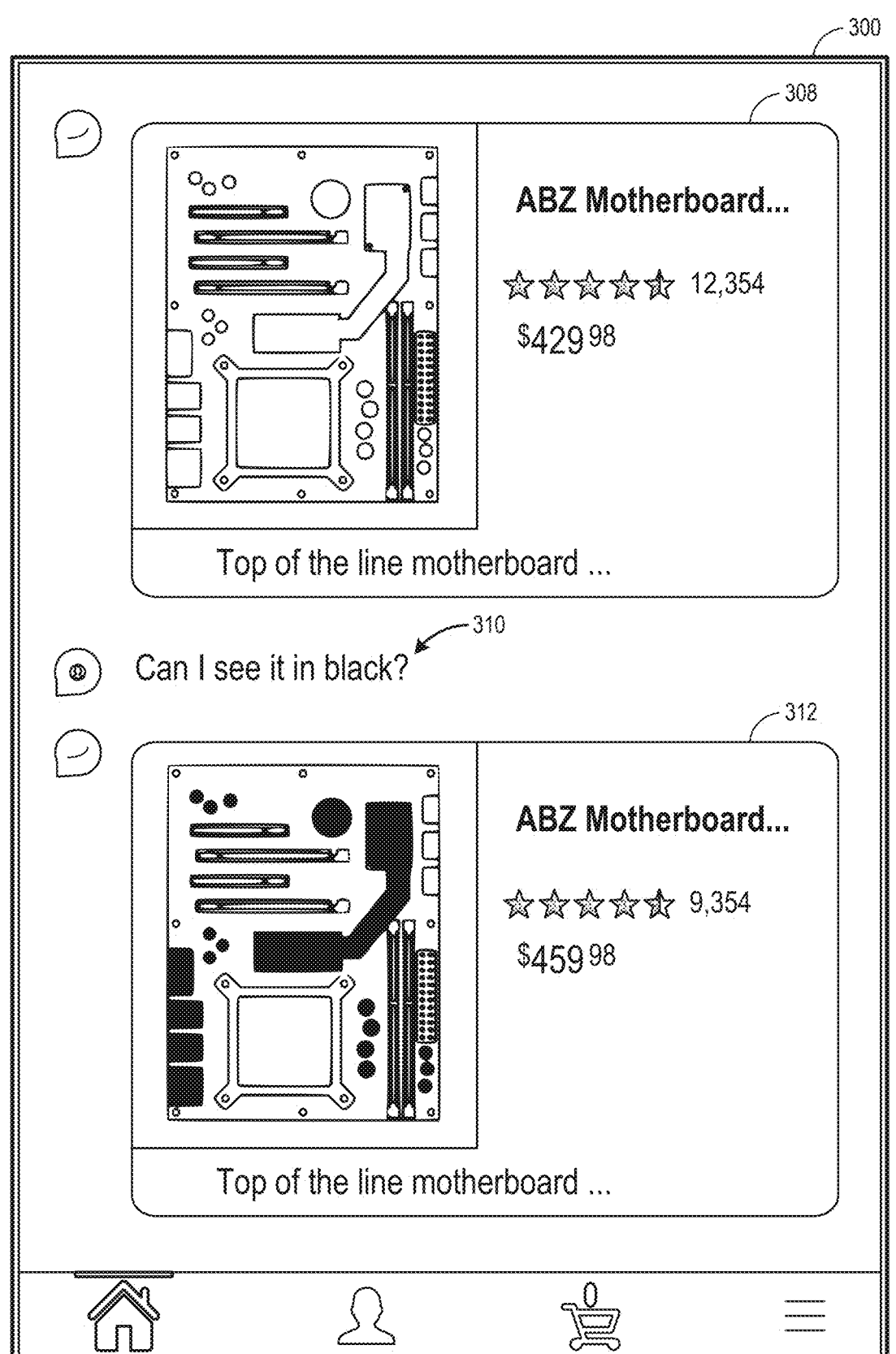

FIGS. 3A-3C depict a user interface 300, which can be presented via the user computing device 102. The user interface 300 shown in FIGS. 3A-3C is the same user interface that can be shown at different times in each figure of FIGS. 3A-3C. As described herein, users can have queries and the AI search system 104 can respond to the queries in an interactive manner. As described herein, the AI search system 104 can receive natural language input (in combination with and/or with respect to other data types, such as images). The AI search system 104 can leverage the generative model orchestrator 118 to interpret the natural language input and perform one or more actions, such as, among others, invoking a search function that can alter an input image. In contrast, a traditional image manipulation user interface require specific user interface inputs via selecting from dropdowns and/or widgets to perform a similar operation. Accordingly, in some embodiments, the user interface 300 can advantageously allow a user to perform complex search operations via natural language input, which can be more intuitive for users than traditional user interfaces.

In FIG. 3A, as shown, the user interface 300 can receive a first input query 302. The first input query 302 can include input data (here "I like this motherboard. Are there similar products?") and an input image 303. A user can input the input query 302 via the user interface 300. Also as shown, the user interface can include user interface elements 304, such as, but not limited to, a home user interface element, a profile user interface element, a cart user interface element, and/or a settings user interface element. As described herein, the user interface 300 can be integrated with the electronic catalog 120.

In FIG. 3B, as shown, the user interface 300 can output a first search result 308 in response to receiving the first input query 302. As described herein, the AI search system 104 can receive the input data (such as the input text and input image) and identify relevant items (such as items with images that are similar to the input image). In FIG. 3C, as shown, the user interface 300 can receive a second input query 310. The second input query 310 can include input data for an interactive search (here the user can be interested in a similar product but in a different color). The additional user input queries can include user input indicative of user intent, such as, altering, complementary, reinforcing, and unrelated intent, as described herein. The second input query 310 can reflect a user's request to modify certain attributes of an initial item. In other cases, a user can request to find an item that complements an initial item (referred to herein as complementary intent); a user can request to provide additional information and/or to improve the initial search results (referred to herein as reinforcing intent); and/or user input can be unrelated to an initial search result, such as indicating a new search objective of the user (referred to herein as unrelated intent). The user interface 300 can output a second search result 312 in response to receiving the second input query 310. As described herein, the AI search system 104 can receive the second input query 310, construct input data for the generative model orchestrator 118 (which can include input data and metadata associated with the previous search result 308), receive an action from the generative model orchestrator 118, execute the action and a service (such as executing a function for a particular search service 130), and output the second search result 312 based at least in part on output from the action and the service.

Figure 4A:
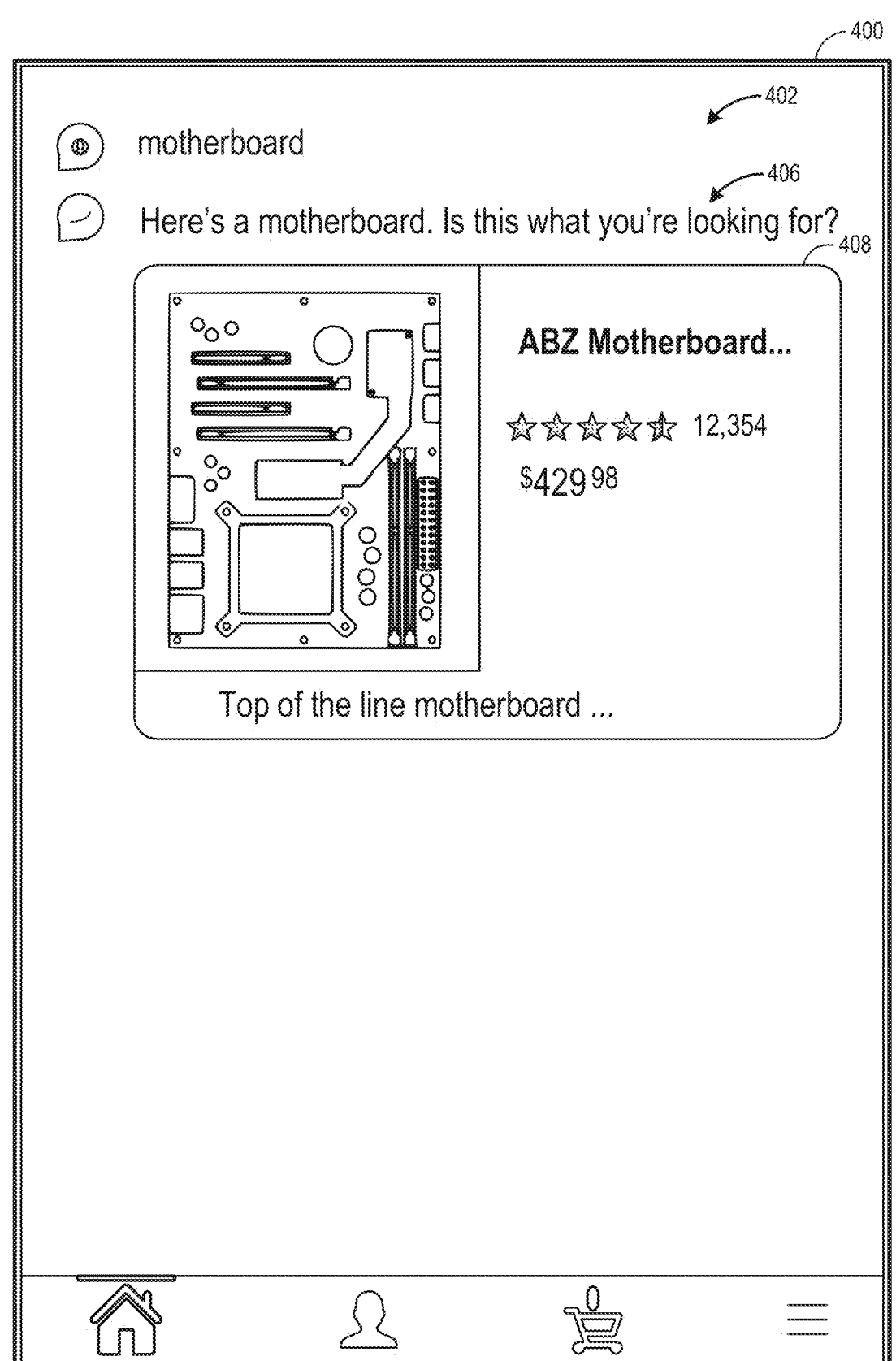
FIGS. 4A-4B depict additional example user interfaces presented on a user computing device referenced in the network environment depicted in FIG. 1.
Figure 4B:
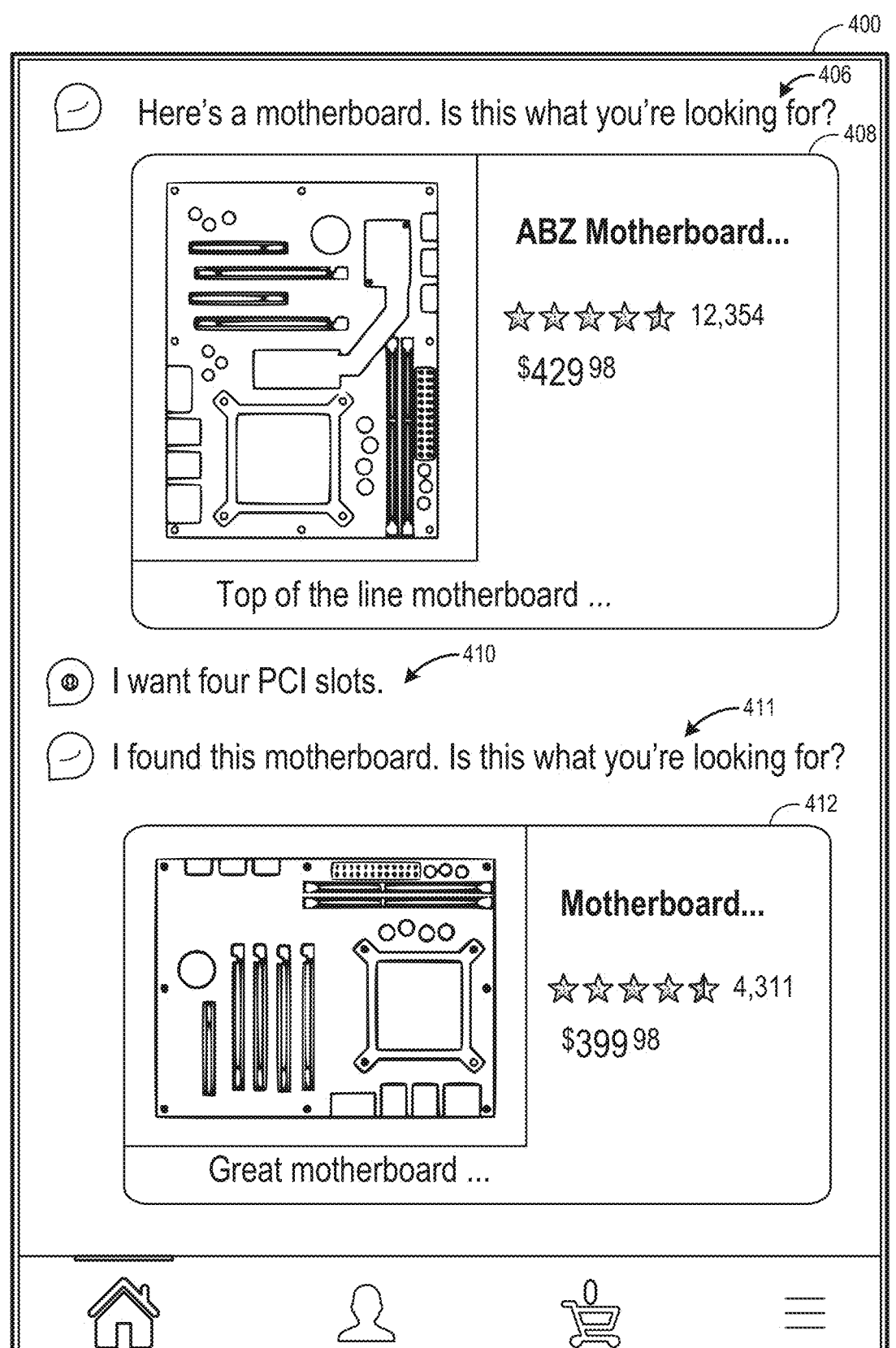

FIGS. 4A-4B depict a user interface 400, which can be presented via the user computing device 102. The user interface 400 shown in FIGS. 4A-4B is the same user interface that can be shown at different times in each figure of FIGS. 4A-4B. The user interface 400 of FIGS. 4A-4B can be similar to the user interface 300 of FIGS. 3A-3C. However, the FIGS. 4A-4B can illustrate additional or alternative features of some embodiments. For example, unlike the example described with respect to FIG. 3A, the example described herein with respect to FIG. 4A can illustrate monomodal user input.

In FIG. 4A, as shown, the user interface 400 can receive a first input query 402. The first input query 402 can include input data (here "motherboard"). A user can input the input query 402 via the user interface 400. The user interface 400 can output a first search result 408 and a first text response 406 in response to receiving the first input query 402. As described herein, the AI search system 104 can receive the input data (such as the input text), identify relevant items (such as items related to the input text), and generate first output text 406. In some embodiments, the first output text 406 can be more verbose than what is shown in FIG. 4A. As described herein, in some embodiments, the first output text 406 can be generated by a generative model.

In FIG. 4B, as shown, the user interface 400 can receive a second input query 410. The second input query 410 can include input data for an interactive search (here the user can be interested in a similar product with a particular number of PCI slots). The user interface 400 can output a second search result 412 and second output data 411 in response to receiving the second input query 410. As described herein, the AI search system 104 can receive the second input query 410, construct input data for the generative model orchestrator 118 (which can include the second input data and metadata associated with the previous search result 408), receive an action from the generative model orchestrator 118, execute the action and a service (such as executing a function for a particular search service 130), and output the second search result 412 based at least in part on output from the action and the service. In some embodiments, the second output text 411 can be more verbose than what is shown in FIG. 4B. As described herein, in some embodiments, the second output text 411 can be generated by a generative model.

In some embodiments, the user interface can provide navigational responses. For example, the user interface could receive a first query including an image, such as a picture of a gift card. The AI search system 104 may automatically provide a search result such as a link to acquire gift cards. However, the user can provide a second query with input data indicating that the user is interested in redeeming a gift card. As described herein, the AI search system 104 can receive the second input query, construct input data for the generative model orchestrator 118 (which can include the input data and metadata associated with the previous search result), receive an action from the generative model orchestrator 118, execute the action and a service (such as executing a function for another service 140, such as a navigation service or a gift card redeeming service), and output a second search result (such as a navigational link to redirect the user to a gift card redemption interface) based at least in part on output from the action and the service. Another navigational example can include a user inputting a picture of some furniture and then providing further input (such as text) indicating an interest to view the furniture in 3D and the AI search system 104 can output a search result for a link to redirect the user to a 3D viewer. Another navigational example can include a user inputting a picture of a receipt and then providing further input (such as text) indicating an interest to return an item and the AI search system 104 can output a search result for a link to redirect the user to a return user interface.

The systems and methods described herein may improve user interface technology. As described herein, traditional text searching has limitations. Users may have difficulty describing in words what they are looking for in particular; for example, a user may not know the specific term for a particular type of charger or connector for a computing device. Also as described herein, traditional graphics user interfaces require specific user inputs via selecting from dropdowns and/or widgets to perform image editing, which can have a steep learning curve and can be difficult for users to understand. The systems and methods described herein can allow a user to more quickly access desired search results in contrast with traditional user interfaces. As described herein, such as with respect to FIGS. 3A-3C, 4A-4B, the user interfaces can allow receiving initial input queries (such as natural language or image input) and outputting initial search results. Users can then, via the user interfaces, provide additional natural language input, which can include user input indicative of user intent, such as, altering, complementary, reinforcing, and unrelated intent, as described herein. The AI search system 104 can receive the additional input and invoke the generative model orchestrator 118 with instructions, the additional input, and context to generate an output action for a service. The AI search system 104 can then execute the output action for the service and determine additional search results based at least in part on the output from the service. For example, if a user wants a product in a different color, without a particular feature, or with an additional feature, the output action can indicate the appropriate service to carry out the action, which can result in quicker results than traditional user interfaces. Accordingly, the systems and methods described herein may improve user interface technology.

Figure 5A:
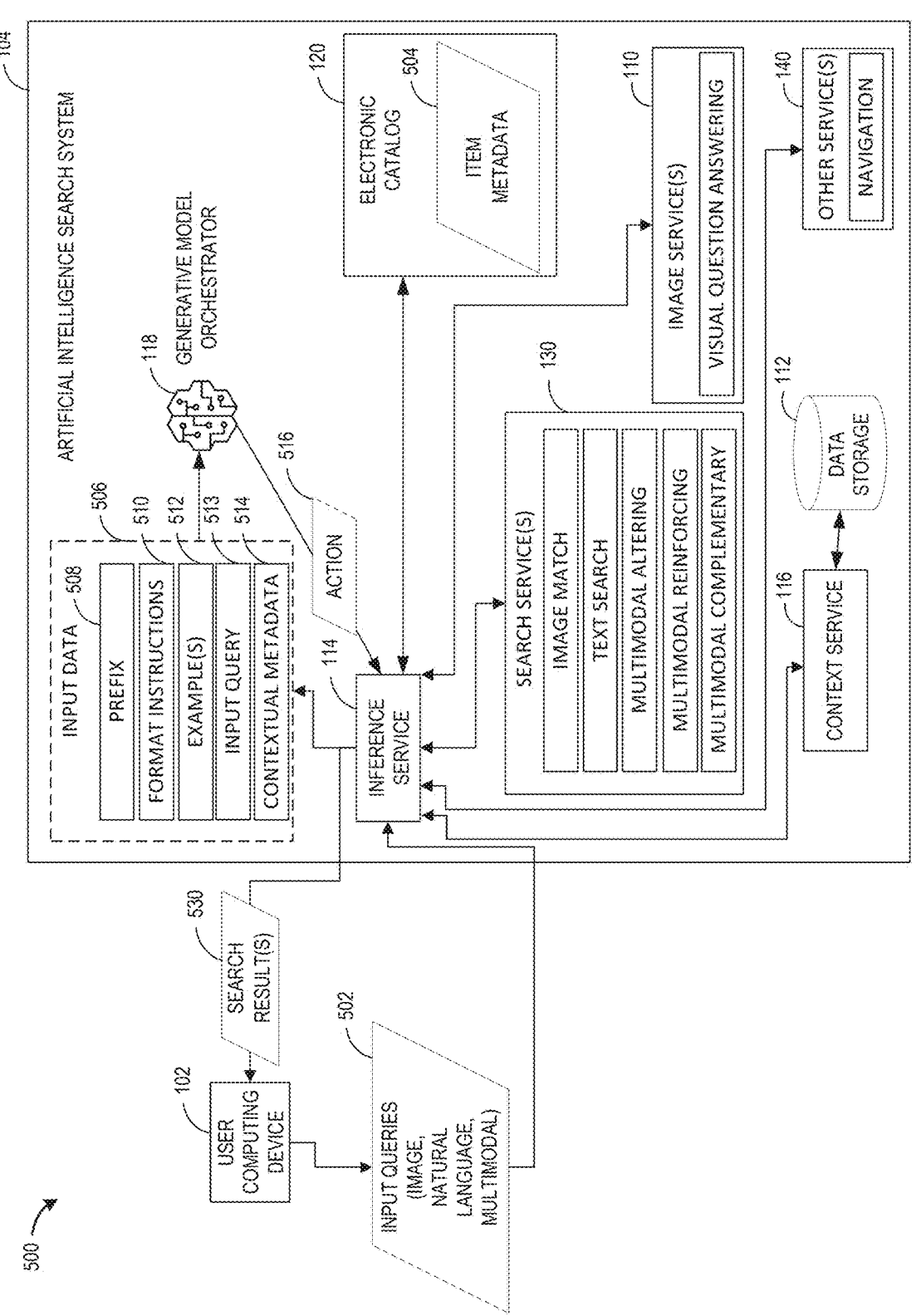
FIGS. 5A-5B are schematic block diagrams depicting an environment in which illustrative components of the AI search system process input queries received from a user computing device.

FIG. 5A is a schematic block diagram depicting an environment 500 in which illustrative components of an AI search system 104 process input queries received from a user computing device 102. As described herein, the components of the AI search system 104 can enable providing search results via an interactive user interface, which can include multimodal capabilities. The environment 500 of FIG. 5A can include the user computing device 102 and the AI search system 104. The AI search system 104 can include the inference service 114, the context service 116, the generative model orchestrator 118, the electronic catalog 120, the search service(s) 130, the image service(s) 110, and/or other service(s) 140.

The user computing device 102 can provide an input query 502, which can include input data (such as text or audio data), image data, and/or other multimodal input, to the AI search system 104. The inference service 114 can receive the input query 502. For example, the input query 502 can include text and an image, such as the text of the input query 302 and image 303 described herein with respect to FIG. 3A. In some embodiments, the inference service 114 can perform a search based at least in part on the input query 502 and retrieve initial search results 530 from the electronic catalog 120. As described herein, the search results 530 can be associated with item metadata 504 (such as item descriptions, titles, etc.) from the electronic catalog 120. An example of initial search results 530 can be the search result 308 described herein with respect to FIG. 3B.

As described herein, the AI search system 104 can receive additional input queries 502. A user can, in the input query 502, indicate that the user is interested in an item with a different feature or aspect with respect to the initial search results 530. For example, the input query 502 can include natural language such as, "Can I see it in black?" The inference service 114 can create input data 506 configured to be provided to the generative model orchestrator 118 based at least in part on the input query 502.

The generative model orchestrator 118 can be instructed to determine different types of user intent. Non-limiting types of user intent can include altering, complementary, reinforcing, and unrelated intent. Altering intent can include a user desiring to modify certain attributes of an initial item, such as changing a color, material, or a feature (such as removing or replacing a feature). Complementary intent can include a user desiring to find an item that complements an initial item, such as, finding a charger for the initial item. Reinforcing intent can include a user desiring to provide additional information and/or to improve the initial search results. Unrelated intent can include user text that is unrelated to an initial search result, such as indicating a new search objective of a user.

The inference service 114 can create the input data 506 with a prefix 508, format instructions 510, example(s) 512, input query 513, and/or contextual metadata 514. The prefix 508 can provide the context to generative model orchestrator 118 regarding the task at hand. An example, non-limiting prefix text can include: "Assistant is designed to be able to assist with searching items. To provide relevant results, Assistant should first review the input query text, which can include contextual related items. The Assistant should then determine which search tool to use to find what the User wants or instructions about the item intent in the form of images and text. Description of items or description of images consists of an estimated product type and top results obtained from an initial query."

In some embodiments, the context service 116 can provide the contextual metadata 514 to the inference service 114. As described herein, the context service 116 can maintain contextual data (such as metadata like previously-identified items in search results, previous user navigations, and/or previous communication history from the user). The context service 116 can store context data in the data storage 112.

The format instructions 510 can provide instructions to the generative model orchestrator 118 that indicate which services can be called in response to a query and a format of the output. An example, non-limiting format instructions text can include: "You can call search service ALTERING_SEARCH(image_file;source attribute; target attribute) to alter an item, COMPLEMENTARY_SEARCH (image_file;text) to find complementary item, and REINFORCING_SEARCH(item, text) to improve the search results. To call a service, start with the prefix 'Action:' and provide the correct variables. ALTERING_SEARCH has three input variables and COMPLEMENTARY_SEARCH has two. If you do not understand the input, please only respond: No action taken." The foregoing text is illustrative and the format instructions 510 can include additional or alternative text regarding additional or alternative services/actions.

The example(s) 512 can include example output for the generative model orchestrator 118, such as example output actions. In some embodiments, the example(s) 512 can include example input, such as example user input associated with the example output. The input query 513 can include the text (such as "motherboard"), image, or other multimodal input from the user computing device 102. The contextual metadata 514 can include metadata associated with previously identified item(s) (such as the titles of items with images that were associated with an initial input image).

In some embodiments, the input data 506 (such as the example(s) 512) can include an instruction to output a step-by-step process and/or the generative model orchestrator 118 can be trained to output a step-by-step process. A step-by-step process can also be referred to as chain-of-thought reasoning. The input data 506 with the step-by-step process instruction can elicit a type of reasoning capability of the generative model orchestrator 118 and/or improve accuracy of the output action. For example, each example provided to the generative model orchestrator 118 can include a step-by-step process to instruct the generative model orchestrator 118 to output acceptable action and parameters.

A non-limiting example 512 is provided in Table 1 below.

TABLE 1

EXAMPLE(S) =
User: I provided a figure named IMG_001.png.
Top-4 results are:
   -Soda Classic-Single Serve, 20 Fluid Ounces
   -Carbonated Soft Drink, 20 Fl Oz Bottle
   -Classic Soda 20 oz Bottles, 8 Units, With V2U Custom Koozie
   -Soda Classic, Original, 20 oz Bottle (Pack of 10, Total of 200 Fl Oz).
User: I want it canned.
Step-by-Step Process: I can see from the previous results
that the uploaded image contains a bottle of Soda. The user
wants a can instead of a bottle. I have to call altering search.
Action: ALTERING_SEARCH(IMG_001.png;bottle;can)

As described herein, the input data 506 can include contextual metadata 514, which can be obtained as part of a retrieval augmented generation technique. A retrieval augmented generation technique can improve the output of the generative model orchestrator 118 by providing the generative model orchestrator 118 with external information associated with user input, such as an input query. The AI search system 104 can perform retrieval augmented generation by retrieving information regarding initial search result(s). In some embodiments, as described herein, the AI search system 104 (such as the inference service 114) can perform image matching to find items with images similar to an initial image provided in user input. As used herein, "image matching" can refer to matching similar (but not identical) images. The inference service 114 can provide top-k search results to the generative model orchestrator 118 via contextual metadata 514.

The inference service 114 can receive the output action 516 from the generative model orchestrator 118. The inference service 114 can execute the output action 516, which can execute one of the search service(s) 130, image service(s) 110, and/or other service(s). The search service(s) 130 can include, but are not limited to, an image matching service, a text search service, a multimodal altering service, a multimodal reinforcing service, a multimodal complementary service. The image service(s) 110 can include, but are not limited to, a visual question answering service, which can answer questions with respect to an input image. The other service(s) 140 can include, but are not limited to, a navigation service.

Figure 5B:
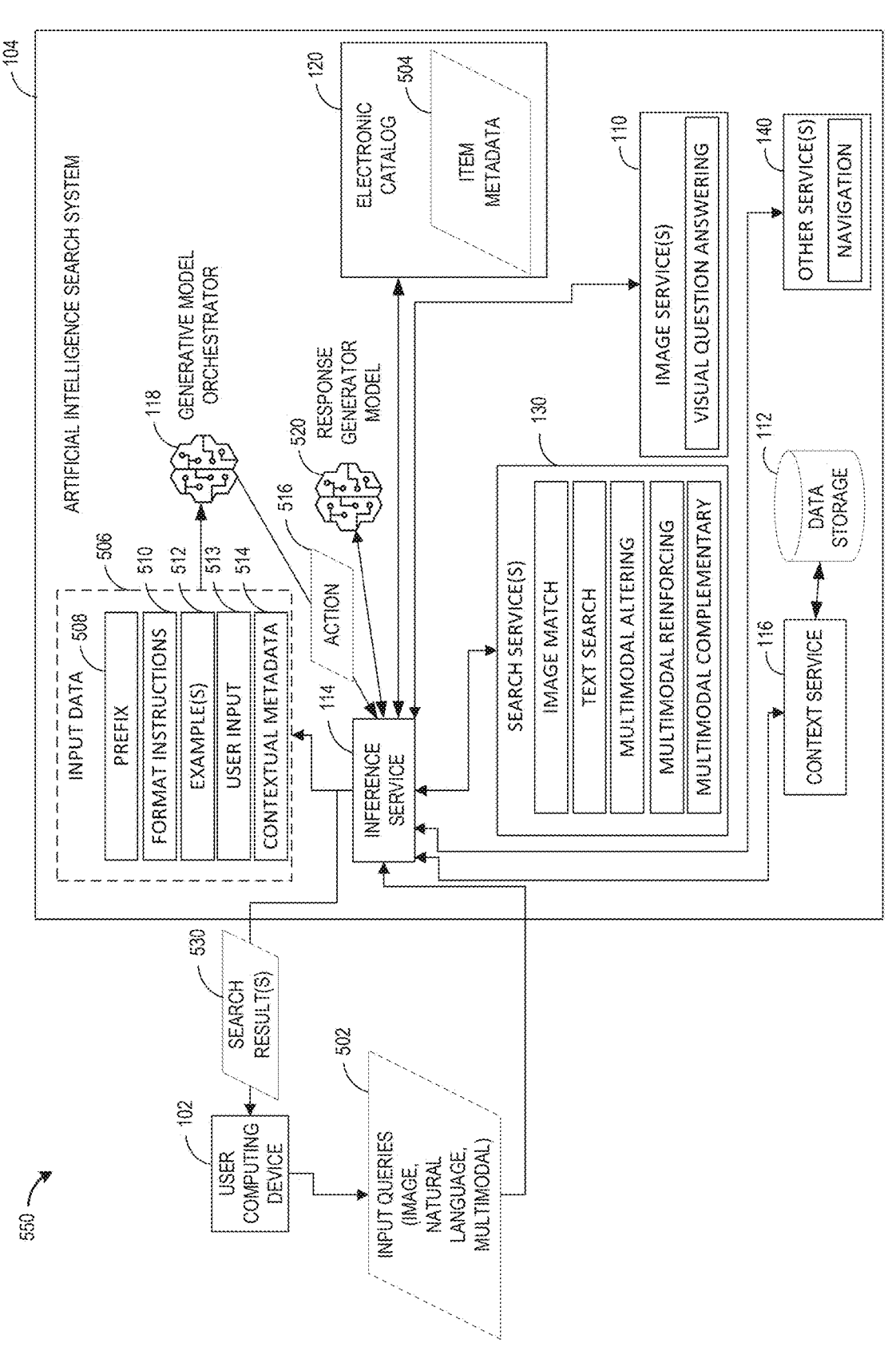

FIG. 5B is another schematic block diagram depicting an environment 550 in which illustrative components of an AI search system 104 process input queries received from a user computing device 102. The environment 550 of FIG. 5B can be similar to the environment 500 of FIG. 5A. As described herein, the components of the AI search system 104 can enable providing search results via an interactive user interface, which can include multimodal capabilities. Moreover, with respect to FIG. 5B, the AI search system 104 can include a response generator model 520.

The AI search system 104 of FIG. 5B can respond to input queries with responses generated by the response generator model 520. The response generator model 520 can be a language model. In some embodiments, the inference service 114 can provide output (such as some search result(s)) and the input query 502 to the response generator model 520, which can be configured to generate a response to the input query 502. The inference service 114 can provide the generated response as part of the search results 530 to the user computing device 102. In some embodiments, the generative model orchestrator 118 can be the same as the response generator model 520.

Figure 6:
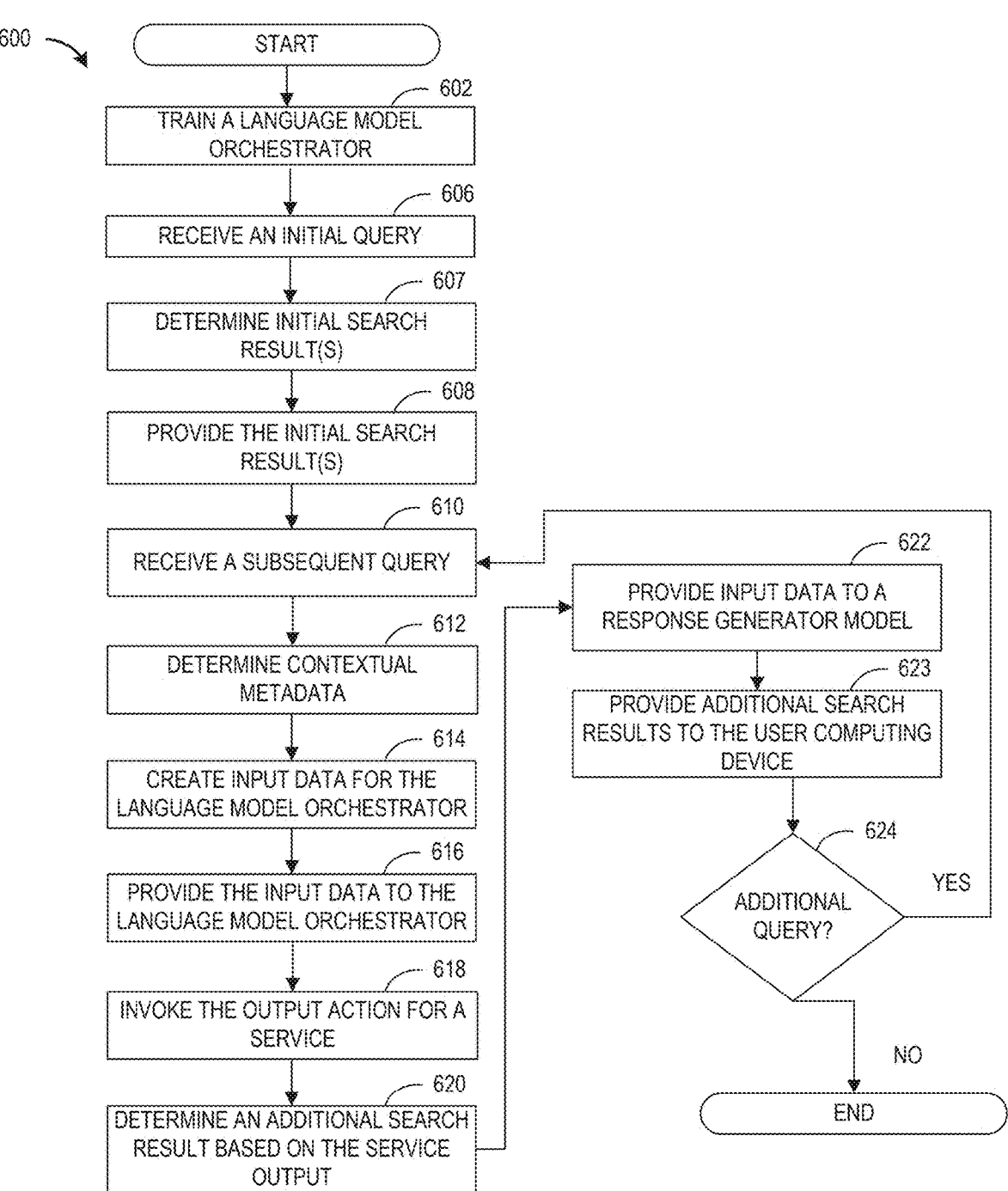
FIG. 6 is a flow chart depicting a method implemented by the AI search system for providing interactive search results in response to input queries.

FIG. 6 includes a flow chart depicting a computer-implemented method 600 for providing interactive search results in response to input queries. The method 600 can enable interactive searching with multimodal capabilities. As described herein, the AI search system 104, which includes the inference service 114 and the context service 116, may be implemented with the computing device 201 of FIG. 2. In some embodiments, the computing device 201 may include the inference application 224, each of which may implement aspects of the method 600. Accordingly, the computing device 201 can implement aspects of the method 600. Moreover, some aspects of the method 600 may be described above with respect to FIGS. 3A, 3B, 3C, 4A, 4B, 5A, and 5B.

Beginning at block 602, a generative model orchestrator can be trained. A training service can train a generative model orchestrator 118 with training data. In some embodiments, the training service can retrain (which can include fine-tuning) a pre-trained model. The training service can train a generative model orchestrator offline before any inference requests are received. The training service can retrain a pre-trained generative model with machine learning and a training data set that includes prompt and response pairs. The training service can output a trained generative model. The prompts in the training data set can include, but is not limited to, the services and/or example step-by-step process text. In some embodiments, the prompts can include input queries, formatting instructions, and/or contextual metadata. The responses in the training data set can include output actions and/or step-by-step process text. The training data can include data similar to the input data 506 described herein, such as with respect to FIG. 5A.

In some embodiments, the training service can train a response generator model 520 with training data. For a response generator model 520, the training service can retrain a pre-trained generative model with machine learning and a training data set that includes prompt and response pairs. The prompts in the training data set can include input queries. In some embodiments, the prompts can include search results. The responses in the training data set can include content responsive to the input queries.

At block 606, an initial query can be received. The AI search system 104 can receive the query via a user interface. The AI search system 104 can receive the query from a user computing device 102. The query can include image data, text data, audio data, and/or multimodal data. As described herein, a user can search for a motherboard with the text "motherboard" and/or an image of a motherboard.

At block 607, initial search results can be determined. The inference service 114 can determine an initial search result associated with an item based at least in part on the initial query. In the case of an initial query that includes an image, the inference service 114 can provide input data based at least in part on the input image to an image matching model. The image matching model can output an indicator for an item image matching the input image. The inference service 114 can identify an item associated with the item image. In the case of with the text "motherboard" and/or an image of a motherboard, the inference service 114 can determine related search results for motherboard items. In some embodiments, if the query includes text, the inference service 114 can use text-based searching to identify related items. If the query includes multimodal input (such as text and images), in some embodiments, the AI search system

104 can execute a multimodal language model that can result in initial search results.

At block 608, the initial search results can be provided. The inference service 114 can provide the initial search results to the user computing device 102. As described herein, the initial search results can be output via a user interface. The initial search results can include images of items from the initial search results.

At block 610, a subsequent query can be received. The block 610 for receiving a subsequent query can be similar to the previous block 606 for receiving an initial query. The AI search system 104 can receive the subsequent query via a user interface. The AI search system 104 can receive the subsequent query from the user computing device 102. The subsequent query can include image data, text data, audio data, and/or other multimodal data. The subsequent query can include input data indicating user intent for a search relative to an initial item. For example, the subsequent query can include input data indicating an attribute change with respect to the initial item (such as a color change, feature change, feature removal, or a material change). As described herein, non-limiting types of user intent can include altering intent, complementary intent, reinforcing intent, and unrelated intent. The subsequent query can include text indicating altering intent, such as a user desiring to modify certain attributes of an initial item, which could be changing a color, material, or a feature (such as removing or replacing a feature). The subsequent query can include text indicating complementary intent, such as a user desiring to find an item that complements an initial item. The subsequent query can include text indicating reinforcing intent, such as a user desiring to provide additional information and/or to improve the initial search results. The subsequent query can include text indicating unrelated intent, such as text that is unrelated to an initial search result. For example, a user can indicate in input data that they want to start a new search.

At block 612, contextual metadata can be determined based at least in part on a query, a search result, or an item. The AI search system 104 can determine, from a database, item metadata associated with an initial item. The AI search system 104 can determine item metadata (such as item descriptions, titles, etc.) from a database in the electronic catalog 120. The AI search system 104 can determine item metadata from at least one of a query, a search result, or a previously determined item. As described herein, item metadata or other contextual metadata can be used as part of the context for a generative model. In some embodiments, the context service 116 can determine contextual metadata (previously-identified items in search results, previous user navigations, and/or previous communication history from the user).

At block 614, input data for the generative model orchestrator 118 can be created. The inference service 114 can create the input data based at least in part on (i) a set instructions to output an action, (ii) the input data from the query, and (iii) the item metadata. The input data can be represented as a feature vector, such as numerical values that represent numeric or symbolic characteristics. As described herein, the non-limiting set of instructions can include the following text: "Assistant is designed to be able to assist with searching items. To provide relevant results, Assistant should first review the input query text, which can include contextual related items. The Assistant should then determine which search tool to use to find what the User wants or instructions about the item intent in the form of images and text. Description of items or description of images consists of an estimated product type and top results obtained from an initial query." As described herein, the non-limiting set of instructions can include the following text: "You can call search service ALTERING_SEARCH (image_file;source attribute; target attribute) to alter an item, COMPLEMENTARY_SEARCH(image_file;text) to find complementary item, and REINFORCING_SEARCH(item, text) to improve the search results. To call a service, start with the prefix 'Action:' and provide the correct variables. ALTERING_SEARCH has three input variables and COMPLEMENTARY_SEARCH two. If you do not understand the input, please only respond: No action taken." The set of instructions can include an instruction to output a step-by-step process. As described herein, the input data can include natural language such as, "Can I see it in black?" In some embodiments, the input data can include example(s), such as the example from Table 1 described above. The example(s) can include example step-by-stop process text. The example(s) can include example output action text. The example(s) can include an example input query associated with the example output action text. The input data can include contextual metadata (such as item titles), which can be obtained as part of a retrieval augmented generation technique. In some embodiments, the generative model orchestrator 118 can correspond to or be a multimodal language model and the input data can include image data for an initial item.

At block 616, the input data can be provided to the generative model orchestrator 118. The inference service 114 can provide the input data to the generative model orchestrator 118. The generative model orchestrator 118 can output an output action for a service from multiple services. The output action can include one or more parameters. As described herein, the service can correspond to: an image matching service configured to identify a second item based at least in part on image similarity; a text search service configured to identify an item based at least in part on input text; a multimodal altering service configured to identify an item based at least in part on an input image and a parameter to alter an attribute; a multimodal reinforcing service configured to identify an item based at least in part on an input image and search text; a multimodal complementary service configured to identify an item based at least in part on an input image and complementary text; a visual question answering service configured to output an answer based at least in part an input image and question text; or a navigation service configured to output a navigational response based at least in part on some input. The output action can include a function call including a source image, an original attribute, and a modified attribute. An example output action can be the following: "ALTERING_SEARCH(IMG_001.png; bottle;can)." In some embodiments, the generative model orchestrator 118 can output multiple actions that include parent and children action(s) such that the output from children actions can be provided to a parent action that generates output.

At block 618, the output action can be invoked for a service. The inference service 114 can invoke the output action for the service. The invoked output action can provide service output. In some cases, such as in the case where the output action is for a search service, the search service can output additional search results. In some cases, such as in the case where the output action is for an image service (such as a visual question answering service), the service output can be an answer regarding an input image. At block 620, additional search results can be determined based at least in part on the service output. As described herein, a search service can provide search results. In other cases, such as where an image service is invoked, the inference service 114 can subsequently invoke a search service with output from the image service (such as a textual description of an aspect of an input image of an item).

At block 622, input data can be provided to a response generator model 520. The inference service 114 can provide input data (which can include the input data from the subsequent query) to a response generator model 520. The response generator model 520 can output response text. In some embodiments, the input data to the response generator model 520 can include the subsequent search results and/or metadata regarding the subsequent search results (such as item titles and/or item descriptions).

At block 623, the additional search results can be provided. The inference service 114 can provide the additional search results to the user computing device 102. As described herein, the additional search results can be output via a user interface. The additional search results can be presented in a graphical user interface. The additional search results can include images of items from the additional search results. In some embodiments, the inference service 114 can provide the generated response text to the user computing device 102, which can be output in a user interface. In some embodiments, the additional search results and/or the generated response text can be output via an audio user interface.

At block 624, it can be determined if there is an additional query. If there is an additional query, the method 600 can return to block 610 to process additional queries. Accordingly, a user can continue to operate interactively with the search results and/or items. Otherwise, the method 600 can end.

The systems and methods described herein may improve the functioning of a computer to identify search result(s) response to a query. Generative models, such as LLMs, take time to generate output. The time a generative model takes to generate output can depend on the size of the generative model and/or the size of the input data. The latency for existing generative models to provide a response to a user computing device, which can then be output by a user interface, may lead to a relatively poor user experience. In some aspects, the systems and methods described herein can include retraining (which can include fine-tuning), which can allow a smaller generative model orchestrator 118 to be retrained that can provide sufficiently accurate results. Moreover, retraining the generative model orchestrator 118 with step-by-step process examples can enable the generative model orchestrator 118 to be prompted to output an action but that excludes step-by-step process text output. Since generating tokens takes time, shortening the possible responses by the generative model orchestrator 118 can improve the functioning of a computer to identify search result(s) response to a query. For example, if the generative model orchestrator 118 can output fewer tokens, such as twenty percent fewer tokens, the generative model can execute approximately twenty percent faster. Accordingly, the systems and methods described herein may improve computer performance and use fewer computing resources. The term computing resource can refer to a physical or virtual component of limited availability within a computer system. Computing resources can include, but are not limited to, computer processors, processor cycles, and/or memory.

While electronics hardware are used as example items herein, the systems and methods described herein can be applied to other items, such as, but not limited to, clothing or shoes. For example, in the context of user intent and search user interface, a user can indicate their desire for a dress with long sleeves where an initial item is a sleeveless dress with natural language by specifying: "Can I see it with long sleeves?"

As used herein, the term "automatic" or "automatically" can refer to working by itself with little or no human intervention.

Also, as used herein, an "input image" can include a resource locator to an image. For example, receiving a query including an input image can include a user providing input to a resource locator identifying an image.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

While certain aspects and implementations are discussed herein with reference to use of an LLM, those aspects and implementations may be performed by any type of AI model. The term "generative model, "model," or "AI model," as used in the present disclosure, can include any computer-based model of any type and of any level of complexity, such as any type of sequential, functional, or concurrent model. Models can further include various types of computational models, such as, for example, artificial neural networks ("NN"), convolutional neural networks ("CNNs), language models (e.g., LLMs), machine learning ("ML") models, multimodal models (e.g., models or combinations of models that can accept multi-modal input. An LLM may be any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answering ("QA") LLM that may be optimized for generating answers from a context, a multimodel LLM, and/or the like. An LLM (and/or other models of the present disclosure), may include, for example, attention-based and/or transformer architecture or functionality and may include an n-gram, exponential, positional, neural network, and/or other type of model.

In various examples, the generative models of the present disclosure may be locally hosted, cloud managed, accessed via one or more Application Programming Interfaces ("APIs"), and/or any combination of the foregoing and/or the like. Additionally, in various implementations, the AI models may be implemented in or by electronic hardware such application-specific processors (e.g., application-specific integrated circuits ("ASICs")), AI processors, including but not limited to neural processing units ("NPUs"), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data and/or the like, and may be stored as vectors, i.e., numerical representations of the data, in a vector database so that the data may be accurately and efficiently retrieved based on vector distance or similarity. Each vector may have number of dimensions, which can range from tens to thousands, depending on the complexity and granularity of the data.

Examples of generative models that may be used in various implementations of the present disclosure include, for example, Bidirectional Encoder Representations from Transformers ("BERT"), Language Model for Dialogue Applications ("LaMDA"), Pathways Language Model ("PaLM"), Pathways Language Model 2 ("PaLM 2"), Generative Pre-trained Transformer 2 ("GPT-2"), Generative Pre-trained Transformer 3 ("GPT-3"), Generative Pre-trained Transformer 4 ("GPT-4"), Large Language Model Meta AI ("LLaMA"), and BigScience Large Open-science Open-access Multilingual Language Model ("BLOOM").

Although the terms machine learning and/or artificial intelligence are used herein, the scope of each term shall include each and every type of machine learning, artificial intelligence, neural network, and the like. An AI model can be built or trained based on sample data or training data in order to make predictions or decisions without being explicitly programmed to do so. In some examples, machine learning methods, models, and/or programs can perform tasks without being explicitly programmed to do so. For example, some aspects of the present disclosure may include training an AI model in a computer to carry out certain desired tasks that a human may not be able to manually perform. The various illustrative logical blocks and modules described in connection with the embodiments disclosed herein can be implemented or performed by a machine, such as a processing unit or processor, a digital signal processor ("DSP"), an ASIC, an FPGA or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a non-transitory data storage medium to store specific computer-executable instructions; and
a computer hardware processor in communication with the non-transitory data storage medium, wherein the computer hardware processor is to execute the specific computer-executable instructions to at least:
receive, via a user interface, a first query from a user computing device, the first query comprising an input image;
determine a first search result associated with a first item based at least in part on the input image;
provide the first search result to the user computing device;
receive, via the user interface, a second query from a user computing device, the second query comprising first input data indicating an attribute change with respect to the first item;
determine, from a database, item metadata from at least one of the first query, the first search result, or the first item;
create second input data based at least in part on (i) a set of instructions to output an action, (ii) the first input data, and (iii) the item metadata;
provide the second input data to a generative model orchestrator, wherein the generative model orchestrator outputs an output action for a first service from a plurality of services, wherein the first service comprises a search service, and the output action indicates the attribute change with respect to the input image;
invoke the output action for the first service, wherein the first service returns a second search result; and
provide the second search result to the user computing device.

2. The system of claim 1, wherein the attribute change with respect to the first item comprises at least one of a color change, feature change, feature removal, or a material change.

3. The system of claim 1, wherein to determine the first search result associated with the first item based at least in part on the input image, the computer hardware processor is to execute further computer-executable instructions to at least:
provide third input data based at least in part on the input image to an image matching model, wherein the image matching model outputs an indicator for an item image matching the input image; and
identify the first item associated with the item image.

4. The system of claim 1, wherein the output action comprises a function call comprising at least one of a source image, an original attribute, or a modified attribute.

5. A computer-implemented method comprising:
receiving, via a user interface, a first query from a user computing device;

determine a first search result associated with a first item based at least in part on the first query;
providing the first search result to the user computing device;
receiving, via the user interface, a second query from a user computing device, the second query comprising first input data indicating user intent for a search relative to the first item;
determining contextual metadata from at least one of the first query, the first search result, or the first item;
creating second input data based at least in part on (i) a set of instructions to output an action, (ii) the first input data, and (iii) the contextual metadata;
providing the second input data to a generative model orchestrator, wherein the generative model orchestrator outputs an output action for a first service from a plurality of services;
invoking the output action for the first service, wherein the first service returns service output;
determining a second search result based at least in part on the service output; and
providing the second search result to the user computing device.

6. The computer-implemented method of claim 5, wherein the first service from the plurality of services corresponds to at least one of:
an image matching service configured to identify a second item based at least in part on image similarity,
a text search service configured to identify a third item based at least in part on input text,
a multimodal altering service configured to identify a fourth item based at least in part on a first input image and a parameter to alter an attribute,
a multimodal reinforcing service configured to identify a fifth item based at least in part on a second input image and search text,
a multimodal complementary service configured to identify a sixth item based at least in part on a third input image and complementary text,
a visual question answering service configured to output an answer based at least in part a fourth input image and question text, or
a navigation service configured to output a navigational response based at least in part on input.

7. The computer-implemented method of claim 5, further comprising:
providing the first input data to a response generator model, wherein the response generator model outputs response text; and
providing the response text to the user computing device.

8. The computer-implemented method of claim 5, wherein the first query comprises at least one of image data, text data, or audio data.

9. The computer-implemented method of claim 5, wherein the generative model orchestrator corresponds to a multimodal language model and the second input data comprises image data for the first item.

10. The computer-implemented method of claim 5, wherein the output action comprises a parameter.

11. The computer-implemented method of claim 10, wherein the second input data comprises step-by-step process text data.

12. The computer-implemented method of claim 5, further comprising:
retraining a pre-trained generative model with a training data set comprising a prompt and response pair, wherein the prompt and response pair comprises the plurality of services and step-by-step process text, wherein retraining the pre-trained generative model further comprises:

outputting the generative model orchestrator.

13. A system comprising:

a non-transitory data storage medium to store specific computer-executable instructions; and a computer hardware processor in communication with the non-transitory data storage medium, wherein the computer hardware processor is to execute the specific computer-executable instructions to at least:

receive, via a user interface, a first query from a user computing device;

determine a first search result associated with a first item based at least in part on the first query;

provide the first search result to the user computing device;

receive, via the user interface, a second query from a user computing device, the second query comprising first input data indicating user intent for a search relative to the first item;

determine, from a database, contextual metadata from at least one of the first query, the first search result, or the first item;

create second input data based at least in part on (i) a set of instructions to output an action, (ii) the first input data, and (iii) the contextual metadata;

provide the second input data to a generative model orchestrator, wherein the generative model orchestrator outputs an output action for a first service from a plurality of services;

invoke the output action for the first service, where the first service returns service output;

determine a second search result based at least in part on the service output; and provide the second search result to the user computing device.

14. The system of claim 13, wherein the first service from the plurality of services corresponds to at least one of:

an image matching service configured to identify a second item based at least in part on image similarity, a text search service configured to identify a third item based at least in part on input text, a multimodal altering service configured to identify a fourth item based at least in part on a first input image and a parameter to alter an attribute, a multimodal reinforcing service configured to identify a fifth item based at least in part on a second input image and search text, a multimodal complementary service configured to identify a sixth item based at least in part on a third input image and complementary text, a visual question answering service configured to output an answer based at least in part a fourth input image and question text, or a navigation service configured to output a navigational response based at least in part on input.

15. The system of claim 13, wherein the computer hardware processor is to execute further computer-executable instructions to at least:

provide the first input data to a response generator model, wherein the response generator model outputs response text; and provide the response text to the user computing device.

16. The system of claim 13, wherein the generative model orchestrator corresponds to a multimodal language model and the second input data comprises image data for the first item.

17. The system of claim 13, wherein the set of instructions comprise an instruction to output a step-by-step process.

18. The system of claim 17, wherein the second input data comprises step-by-step process text data.

19. The system of claim 13, wherein the second input data comprises output action text data.

20. The system of claim 19, wherein the second input data comprises an input query associated with the output action text data.

\* \* \* \* \*